United States Patent
Abreu et al.

(10) Patent No.: US 9,344,168 B2
(45) Date of Patent: *May 17, 2016

(54) BEAMFORMER PHASE OPTIMIZATION FOR A MULTI-LAYER MIMO SYSTEM AUGMENTED BY RADIO DISTRIBUTION NETWORK

(71) Applicant: Magnolia Broadband Inc., Englewood, NJ (US)

(72) Inventors: Eduardo Abreu, Allentown, PA (US); Haim Harel, New York, NY (US); Kenneth Kludt, San Jose, CA (US); Phil F. Chen, Denville, NJ (US); Sherwin J. Wang, Towaco, NJ (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,920

(22) Filed: Jul. 1, 2014

(65) Prior Publication Data

US 2014/0376671 A1 Dec. 25, 2014

Related U.S. Application Data

(63) Continuation of application No. 13/776,204, filed on Feb. 25, 2013, now Pat. No. 8,767,862, which is a continuation-in-part of application No. 13/630,146, filed on Sep. 28, 2012, now Pat. No. 8,654,883.

(Continued)

(51) Int. Cl.
*H04B 7/10* (2006.01)
*H04L 1/02* (2006.01)

(Continued)

(52) U.S. Cl.
CPC .............. *H04B 7/0456* (2013.01); *H04B 7/086* (2013.01); *H04B 7/088* (2013.01); *H04B 7/0413* (2013.01)

(58) Field of Classification Search
CPC ........ H04B 1/123; H04B 7/002; H04B 1/109; H04L 1/06; H04L 25/0204
USPC ................. 375/130–153, 229–236, 259–285, 375/316–352
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 189 303 | 3/2002 |
| EP | 1 867 177 | 5/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — James M Perez
(74) *Attorney, Agent, or Firm* — Pearl Cohen Zedek Latzer Baratz LLP

(57) ABSTRACT

A system for selecting optimal phase combinations for RF beamformers in a MIMO hybrid receiving systems augmented by RF Distribution Network. The system addresses the issue of providing beamforming gains for a plurality of layers using one common set of weights for each beamformer. The specification may be based on channel estimation of all layers as viewed by all receiving antennas, and maximizing metrics that capture the total received power.

6 Claims, 4 Drawing Sheets

Related U.S. Application Data

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/658,010, filed on Jun. 11, 2012, provisional application No. 61/658,012, filed on Jun. 11, 2012, provisional application No. 61/671,416, filed on Jul. 13, 2012.

(51) Int. Cl.
*H04B 7/04* (2006.01)
*H04B 7/08* (2006.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,094,165 A | 7/2000 | Smith | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 | 11/2003 | Kuwahara et al. | |
| 6,697,622 B1 | 2/2004 | Ishikawa et al. | |
| 6,697,633 B1 | 2/2004 | Dogan et al. | |
| 6,735,182 B1 | 5/2004 | Nishimori et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,934,541 B2 | 8/2005 | Miyatani | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 | 12/2006 | Liu et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 | 1/2011 | Han et al. | |
| 7,881,401 B2 | 2/2011 | Kraut et al. | |
| 7,898,478 B2 | 3/2011 | Niu et al. | |
| 7,904,086 B2 | 3/2011 | Kundu et al. | |
| 7,904,106 B2 | 3/2011 | Han et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,111,782 B2 | 2/2012 | Kim et al. | |
| 8,115,679 B2 | 2/2012 | Falk | |
| 8,155,613 B2 | 4/2012 | Kent et al. | |
| 8,194,602 B2 | 6/2012 | van Rensburg et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 | 8/2013 | Khojastepour | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 | 10/2013 | Jiang et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 | 12/2013 | Fujimoto | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 | 3/2014 | Naguib | |
| 8,744,511 B2 | 6/2014 | Jones, IV et al. | |
| 8,754,810 B2 | 6/2014 | Guo et al. | |
| 8,767,862 B2 * | 7/2014 | Abreu et al. | 375/267 |
| 8,780,743 B2 | 7/2014 | Sombrutzki et al. | |
| 8,797,969 B1 | 8/2014 | Harel et al. | |
| 8,891,598 B1 | 11/2014 | Wang et al. | |
| 8,928,528 B2 | 1/2015 | Harel et al. | |
| 8,942,134 B1 | 1/2015 | Kludt et al. | |
| 8,976,845 B2 | 3/2015 | O'Keeffe et al. | |
| 8,995,416 B2 | 3/2015 | Harel et al. | |
| 9,014,066 B1 | 4/2015 | Wang et al. | |
| 9,035,828 B2 | 5/2015 | O'Keeffe et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |

(56) References Cited

U.S. PATENT DOCUMENTS

| | | |
|---|---|---|
| 2005/0075140 A1 | 4/2005 | Famolari |
| 2005/0085266 A1 | 4/2005 | Narita |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1* | 9/2007 | Gilbert et al. ............ 370/235 |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1* | 9/2010 | Shabtay et al. ............ 455/562.1 |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1* | 9/2012 | Keusgen et al. ............ 375/227 |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |

(56) References Cited

U.S. PATENT DOCUMENTS

| | | |
|---|---|---|
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0188541 A1 | 7/2013 | Fischer |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1 | 11/2013 | Ghosh et al. |
| 2013/0304962 A1 | 11/2013 | Yin et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0079016 A1 | 3/2014 | Dai et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |
| 2014/0241182 A1 | 8/2014 | Smadi |
| 2014/0242914 A1 | 8/2014 | Monroe |
| 2014/0269409 A1 | 9/2014 | Dimou et al. |
| 2014/0307653 A1 | 10/2014 | Liu et al. |
| 2015/0016438 A1 | 1/2015 | Harel et al. |
| 2015/0018042 A1 | 1/2015 | Radulescu et al. |
| 2015/0085777 A1 | 3/2015 | Seok |
| 2015/0124634 A1 | 5/2015 | Harel et al. |
| 2015/0139212 A1 | 5/2015 | Wang et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.

(56) References Cited

OTHER PUBLICATIONS

Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, no. Ljubljana; Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 13/775,886 dated Mar. 23, 2015.

(56) References Cited

OTHER PUBLICATIONS

Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International U.S. Appl. No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE Infocom 2014—IEEE Conference on Computer Communications, IEEE, Apr. 27, 2014, pp. 817-825.
Office Action issued by the United States Patent and Trademark Office for U.S. Appl. No. 13/888,057 dated Jul. 9, 2015.
Office Action issued by the United States Patent and Trademark Office for U.S. Appl. No. 14/173,640 dated Jul. 16, 2015.
Office Action issued by the United States Patent and Trademark Office for U.S. Appl. No. 14/517,114 dated Jul. 28, 2015.
Office Action issued by the United States Patent and Trademark Office for U.S. Appl. No. 14/672,634 dated Aug. 12, 2015.

* cited by examiner

| POWER | X-VOLTS | Y-VOLTS | VECTOR ADDITION | | GAIN [dB] |
|---|---|---|---|---|---|
| 0.33 | 0.57735 | 0.00000 | | | |
| 0.33 | 0.57735 | 0.00000 | | | |
| 0.33 | 0.57735 | 0.00000 | | | |
| | 1.732051 | 0.00000 | 3 | 0.0 | 4.77 |

501

| POWER | X-VOLTS | Y-VOLTS | VECTOR ADDITION | | GAIN [dB] |
|---|---|---|---|---|---|
| 0.33 | | 0.57735 | | | |
| 0.33 | 0.57735 | 0.00000 | | | |
| 0.33 | 0.57735 | 0.00000 | | | |
| | 1.154701 | 0.57735 | 1.333333 | 0.3333 | 2.22 |

502

| POWER | X-VOLTS | Y-VOLTS | VECTOR ADDITION | | GAIN [dB] |
|---|---|---|---|---|---|
| 0.33 | 0.57735 | 0.00000 | | | |
| 0.33 | 0.57735 | 0.00000 | | | |
| 0.33 | -0.57735 | 0.00000 | | | |
| | 0.57735 | 0.00000 | 0.333333 | 0.0 | -4.77 |

503

| POWER | X-VOLTS | Y-VOLTS | VECTOR ADDITION | | GAIN [dB] |
|---|---|---|---|---|---|
| 0.33 | 0.57735 | 0.00000 | | | |
| 0.33 | | 0.57735 | | | |
| 0.33 | -0.57735 | 0.00000 | | | |
| | 0 | 0.57735 | 0 | 0.33333 | -4.77 |

504

| POWER | X-VOLTS | Y-VOLTS | VECTOR ADDITION | | GAIN [dB] |
|---|---|---|---|---|---|
| 0.33 | 0.57735 | 0.00000 | | | |
| 0.33 | | 0.57735 | | | |
| 0.33 | | 0.57735 | | | |
| | 0.57735 | 0.00000 | 0.333333 | 0.0 | -4.77 |

505

BEAMFORMER PHASE OPTIMIZATION FOR A MULTI-LAYER MIMO SYSTEM AUGMENTED BY RADIO DISTRIBUTION NETWORK

CROSS-REFERENCE TO RELATED APPLICATIONS

This application is a continuation application of U.S. non-provisional patent application Ser. No. 13/776,204 filed on Feb. 25, 2013, which is a continuation-in-part application of U.S. non-provisional patent application Ser. No. 13/630,146 filed on Sep. 28, 2012, which in turn claims benefit from U.S. provisional patent application Nos. 61/652,743 filed on May 29, 2012; 61/657,999 filed on Jun. 11, 2012; and 61/665,592 filed on Jun. 28, 2012; and U.S. non-provisional patent application Ser. No. 13/776,204 further claims benefit from U.S. provisional patent application Nos. 61/658,015 filed on Jun. 11, 2012; 61/658,010 filed on Jun. 11, 2012; 61/658,012 filed on Jun. 11, 2012; and 61/671,416 filed on Jul. 13, 2012, all of which are incorporated herein by reference in their entirety.

FIELD OF THE INVENTION

The present invention relates generally to the field of radio frequency (RF) multiple-input-multiple-output (MIMO) systems and more particularly to systems and methods for RF MIMO systems using RF beamforming and/or digital signal processing, to augment the receiver performance.

BACKGROUND

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennas and M>N). This architecture employs a beamformer for each channel so that two or more antennas are combined for each radio circuit that is connected to each one of the channels.

In hybrid MIMO RDN receiving systems, when the phases of the received signals from each antenna are properly adjusted or tuned with respect to one another, the individual signals may be combined and result in an improved performance of the receiving system.

FIG. 1 shows an example of a standard 2×2 MIMO radio 20 with two antennas A and B communicating with a base station 10 having two transmit antennas radiating Tx1 and Tx2. While each antenna receives both transmitted layers, the baseband separates them and processes them in an optimal way

SUMMARY

Embodiments of the present invention address the challenge of aligning the phases in the receive antennas coupled to the beamformers in the hybrid MIMO RDN architecture, in order to mitigate the combiners losses caused by misaligned phases.

Embodiments of the present invention are based on seeking maximization of the total power received from all transmitted layers as measured by the MIMO's baseband; the summation includes all transmitting antennas signals, as viewed by all receiving RDN antennas, which are equipped with phase shifters.

The received powers may be measured via channel estimation of individual antennas thru their respective beamformers, radios and baseband circuitry.

Different metrics are provided to quantify the said total received power:

$$P_{TOTAL} = \sum_{j=1}^{M} \sum_{k=1}^{L} P_{j,k},$$

wherein $P_{j,k}$ denotes power associated with each one of received signals $S_{j,k}$ so that $P_{j,k}=[abs(S_{j,k})]^2$ $j=1, 2 \ldots M, k=1, 2 \ldots L$.

It would be therefore advantageous to find a way to use a single degree of freedom i.e. the need to choose or select one phase in aligning a beamformer that serves 2, 4, or more different phase setting, stemming from the fact that multiple incoming signals have each a specific possible phase alignment for the beamformer.

The requirement for optimal alignment of phases for all transmitted layers appears also in higher MIMO ranks and in various RDN configurations. A general optimization process is addressed in embodiments of the invention described herein.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
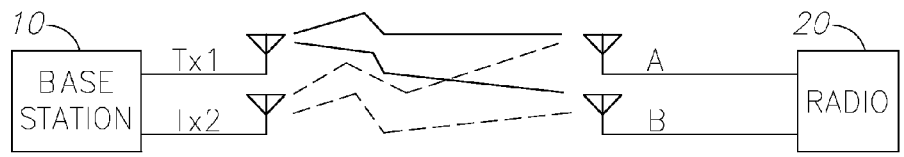
FIG. 1 is a high level block diagram illustrating a system according to some embodiments of the prior art.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 2:
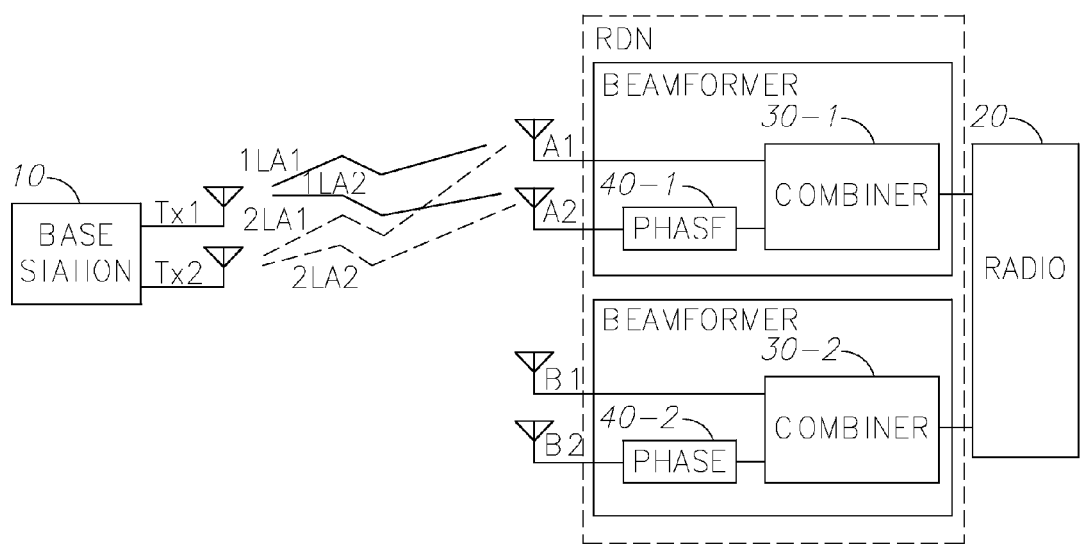
FIG. 2 is a high level block diagram illustrating a system according to some embodiments of the present invention.

FIG. 2 shows an example of a 2×2 MIMO RDN architecture in which each receive antenna as shown in FIG. 1 such as A1, and B1 are enhanced by adding another antenna, A2 and B2 respectively, thus providing reception by four antennas instead of two. The hybrid MIMO RDN architecture further includes phase shifters 40-1 and 40-2 and combiners 30-1 and 30-2.

Without losing generality, and for the sake of simplified explanation, it is assumed herein that the base station transmits each layer over one Tx antenna.

The Hybrid MIMO RDN can provide an additional gain however, as the combiners 30-1 and 30-2 are serving two different Tx antennas with only one phase shifter, it is possible that the diversity parameters (e.g., phase) that are used to optimize the reception of Tx1 are not the same as those needed for receiving Tx2. This is especially true if the antennas are not correlated from one to another.

As seen in FIG. 2, if the phase shift introduced in the path from antenna radiating Tx1 (1LA1-1LA2) is compensated by the phase shifter, that phase shifter setting will only be correct it the paths from the antenna radiating Tx2 are the same. That is, the phase setting will only be correct if (2LA1-2LA2) is the same or a multiple wavelength from (1LA1-1LA2). A similar outcome holds for the Tx1 and Tx2 signals received by Antennas B1 and B2.

If the case using four 90° phase shifts is compared to align the signals from Tx1, it is apparent that there are three possible outcomes for the Tx2 signal:

The first outcome is that the signals arrive at the antennas A1 and A2 with a similar phase differences as for the Tx1 transmission so the same phase setting used to enhance the reception of Tx1 will also enhance Tx2. (25%);

The second outcome is that the resulting Tx2 signals to A1 and A2 are +/−90° from each other and will produce zero diversity gain for this process. (50%); and The third outcome is that the resulting Tx2 signals are 180° from each other and can cancel each other or produce a negative diversity gain depending on their relative amplitudes. (25%).

When the result is the aforementioned third outcome, the system must choose to sacrifice diversity gain for Tx1 in order to avoid the total loss of the Tx2 signal. This would result in low diversity gain (~0 dB) for both Tx1 and Tx2.

The algorithm offered by embodiments of the invention results in phase optimization based on seeking maximization of the total power received from all transmitted layers as measured by the MIMO's baseband; the summation includes all transmitting antennas signals, as viewed by all receiving RDN antennas, which are equipped with phase shifters. The aforementioned received powers are measured via channel estimation of individual antennas thru their respective beamformers, radios and baseband circuitry.

In accordance with some embodiments of the present invention, a multiple inputs multiple outputs (MIMO) receiving system having number N channels is provided. The MIMO receiving system may include a radio distributed network (RDN) having number N beamformers, each having number $K_N$ antennas. The MIMO system may further include at least one phase shifter associated with one or more of the N beamformers. Additionally, the MIMO receiving system is configured to: (a) select one phase that optimizes performance of multiple layers, via channel estimation of each layer as seen (e.g, taking into account the gain and phase affected by the physical location) by each receiving antenna, and (b) maximize a total received power from all transmitted signals.

Figure 3:
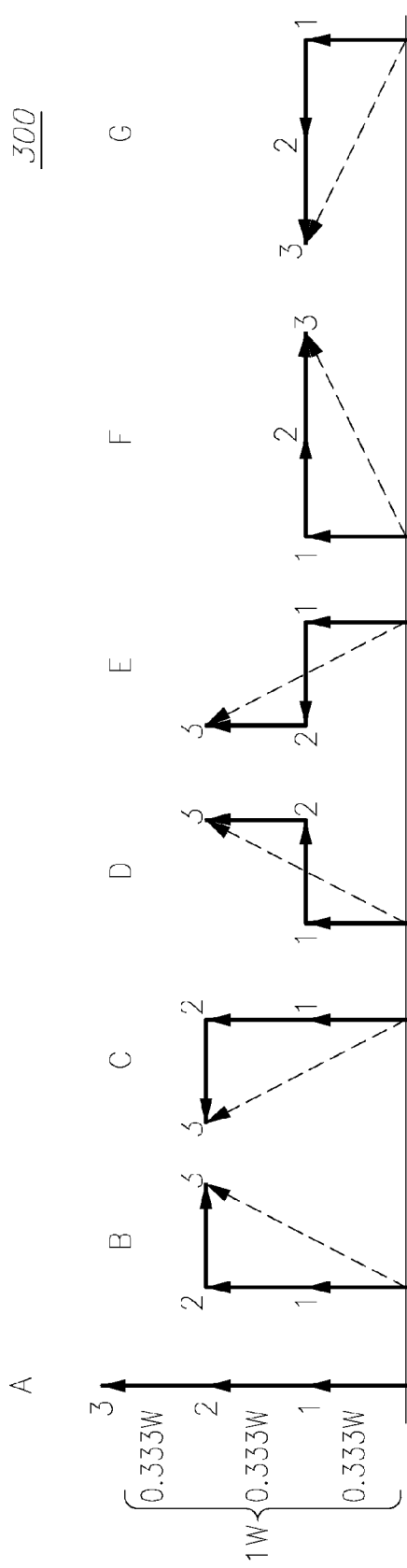
FIGS. 3 and 4 are signal diagrams illustrating an aspect according to embodiments of the present invention.
Figure 4:
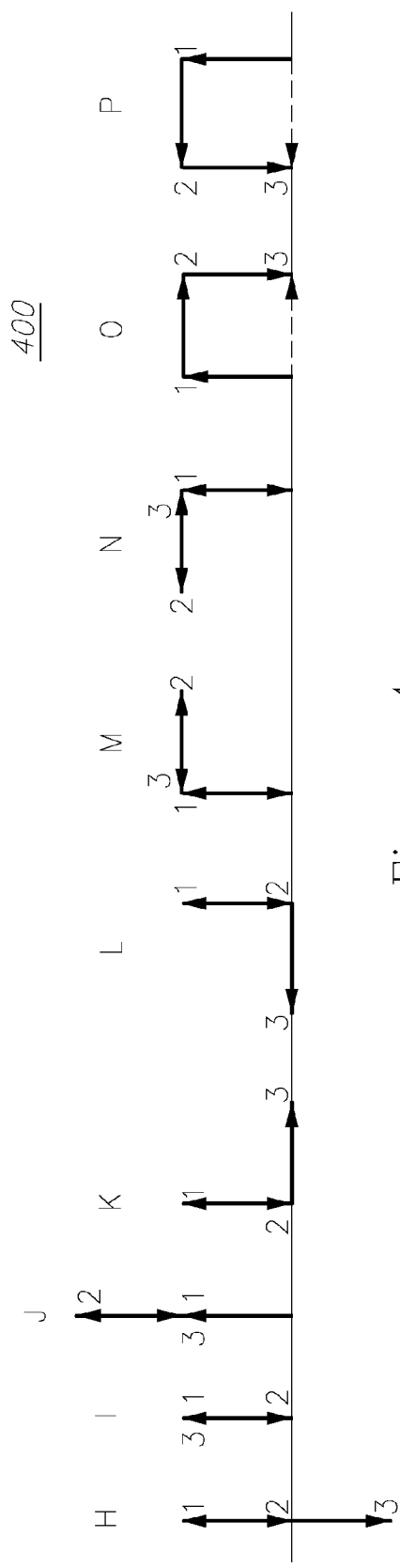

FIGS. 3 and 4 are signal diagrams illustrating an aspect according to embodiments of the present invention. In the following non-limiting example, a case of N plurality of uncorrelated transmit signals projected from a base station, where N=2, is received by a 2×2 MIMO UE which is augmented by an RDN with 2 beamformers, each beamformer has three receive antennas. It is assumed, for the sake of the following example that the beamformers can select one of 4 possible phases: 0°, 90°, 180°, and 270°. When selecting the beamformers' phases is such a way that will maximize the received signal coming from Tx1, the Tx 2 phases may or may not be constructively combined, but rather, may have 1*4*4=16 phase combinations.

For the sake of simplicity, it is assumed that each receive antenna provides the same amplitude and a randomly selected phase out of 4 alternatives. It is also assumed that the amplitudes power is 0.33 (for the sake of the example).

As the signals are fed into an RF combiner, the translation into voltage of each signal provides a combined result as described herein below:

In FIG. 3-A, 3 aligned vectors, each of ⅓ of a Watt are depicted so that the combined voltage equals 3×SQRT (0.333)=1.732 V=>3 W. Since the gain is the output divided by the input, the gain here equals 3 W/1 W=3, hence 4.77 dB. FIG. 3-B depicts two aligned vectors each of ⅓ of a Watt and a single ⅓ Watt perpendicular vector so that the combined voltage equals SQRT (0.33)+j SQRT (0.33)=>Effective voltage combining=SQRT $[(2×0.577)^2+0.577^2]$=>1.67 W. For a similar reason, the gain equals 1.67 W/1 W=1.67 hence 2.2 dB. Similar calculation for FIGS. 3-C, D, E, F, G generates the gains of 2.2 for each one. Applying similar calculation for FIGS. 3-H, I, J, K, L, M, N, O, P generates the gains of −4.77 dB for each one.

As can be seen, the seven combinations described in FIG. 3-A through G provide positive gains for both layers, while the nine combinations described by FIG. 4-H through P, provide positive gain for one layer and negative gain for the other.

Figure 5:
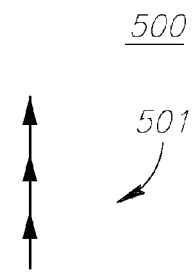
FIG. 5 is a table with signal diagrams illustrating an aspect according to embodiments of the present invention.
Figure 5:
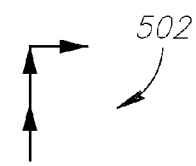
Figure 5:
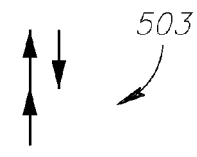
Figure 5:
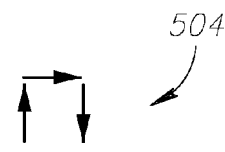
Figure 5:
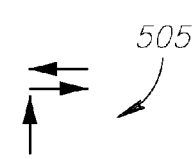

FIG. 5 demonstrates in form of a table and a corresponding signal diagram how theses conclusion have been reached. Specifically, table 500 illustrates the aforementioned calculations with specific configurations 501-505.

It can be easily seen that while configuration 501 yields 4.77 dB gain, configuration 502 yields a lesser yet still positive gain of 2.22 dB. Configurations 503-505 on the other hand, yield a negative gain of −4.77 dB.

As can be seen above in FIGS. 3 and 4 when aligning one transmit signal to best gain, the second transmit signal is left for random combination of phases, and may become exceedingly adverse at many of the cases.

Figure 6:
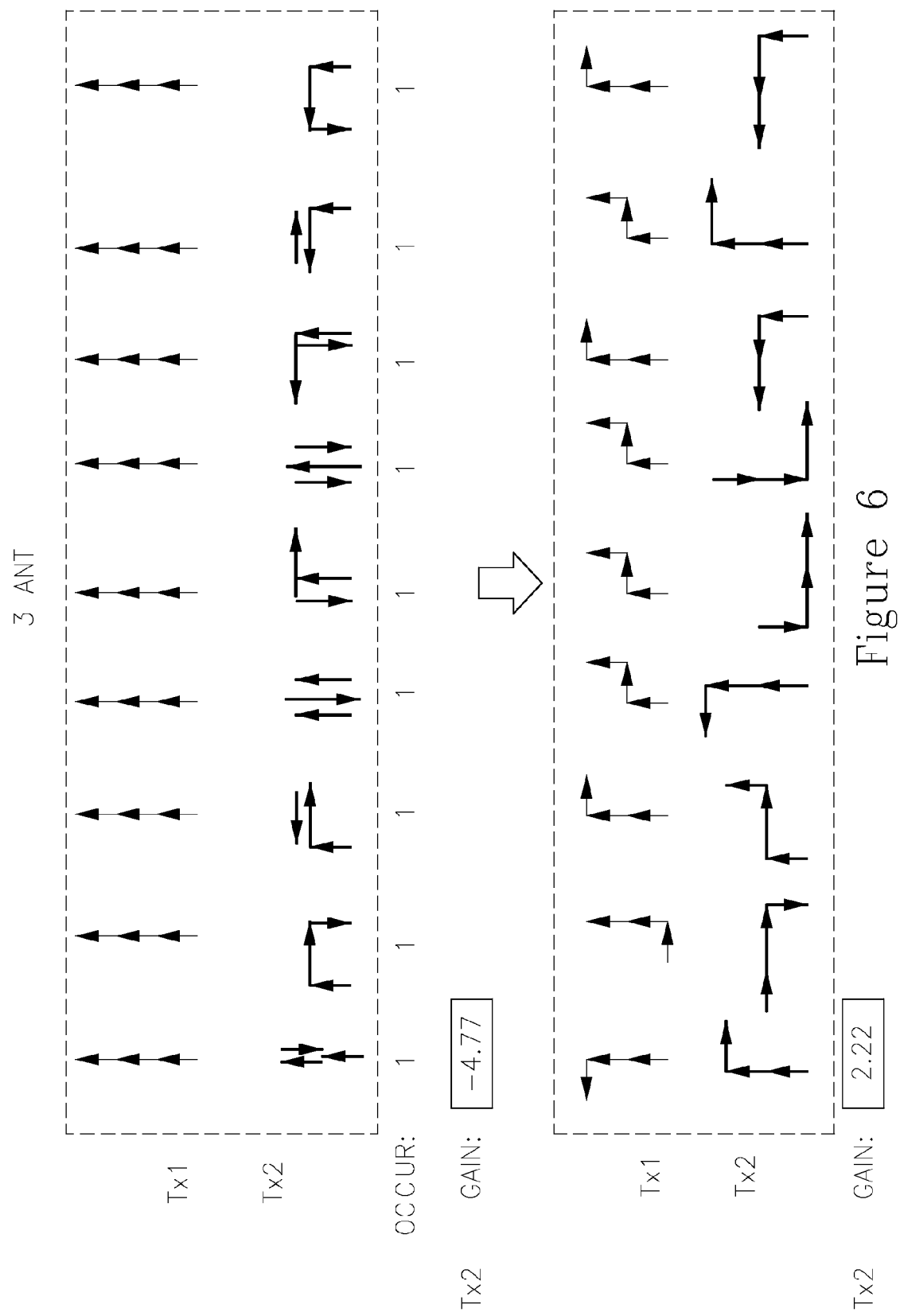
FIG. 6 is a signal diagram illustrating yet another aspect according to embodiments of the present invention.

FIG. 6 illustrates improvements that can be achieved by embodiments of the present invention in overall gain terms. The upper part illustrates cases where the selection of a maximal gain for Tx 1, where all antennas are aligned, undermines the gain for Tx 2. The lower part of FIG. 6 demonstrates that replacing +4.77 dB gain for layer 1 and −4.77 dB for layer 2 provides gains of +2.22 dB for both layers at 9 out of 16 of the cases; (it is noted that in other 6 cases, the corresponding gains are +4.77 dB and 2.22 dB, and in one other case both are +4.77 dB)

Similar approaches can be applied to more complex MIMO hybrid RDN configurations, where there are more layers and or more antennas are combined by RF beamformers.

One embodiment of metrics and a procedure for the selection of optimal phase settings to all participating beamformers is described below:

Consider a beamformer with $K_N$ receive antennas, each of them receiving signals from N transmit antennas. The channel functions $h_{i,j,k}$ from transmit antenna j, j=1, 2 ... N, to receive antenna i, i=1, 2 ... $K_N$, at frequency k, k=1, 2 ... L (it is assumed the general case of frequency selective channels) are obtained through channel estimation done by the base-band.

Each receive antenna is equipped with a set A of R phase shifters, }, for phase adjustment. The set A of phase shifters could be, for example, to, {0, 90, 180, 270} degrees. The algorithm needs to select the optimal phase $\phi_i \in A$ to be applied to receive antenna: i, i=1, 2 ... $K_N$.

After phase adjusting the $K_N$, receive antennas, the overall channel functions seen by the receiver under consideration are:

$$S_{j,k} = \sum_{i=1}^{K_N} h_{i,j,k} e^{j\Phi_i}, \; j = 1, 2 \ldots N, k = 1, 2 \ldots L.$$

A power $P_{j,k}$ is associated with each one of them:

$$P_{j,k} = [abs(S_{j,k})]^2, \; j = 1, 2 \ldots N, \; k = 1, 2 \ldots L.$$

In one embodiment the algorithm selects phases $\phi_i \in A$, i=1, 2 ... $K_N$, so as to maximize the total power $P_{Total}$ defined as:

$$P_{TOTAL} = \sum_{j=1}^{N} \sum_{k=1}^{L} P_{j,k}.$$

In another embodiment, a procedure and metrics is provided wherein the antennas, e.g., antenna phases, are adjusted one by one recursively. As before, $\phi_1$ may be set to zero. To calculate $\phi_2$ the contributions from only $h_{1,j,k}$ and $h_{2,j,k}$ are considered. The combined channel $s_{2,j,k}$ and channel power $p_{2,j,k}$ for the first two antennas are defined as:

$$S_{2,j,k}=h_{1,j,k}e^{j\phi 1}+h_{2,j,k}e^{j\phi 2} j=1,2 \ldots N, k=1,2 \ldots L$$

$$p_{2,j,k}=[abs(S_{2,j,k})]^2, j=1,2 \ldots N, k=1,2 \ldots L$$

The algorithm selects or chooses $\phi_2 \in S$ that maximizes $$\sum_{j=1}^{N} \sum_{k=1}^{L} p_{2,j,k}.$$

Continuing in a similar fashion for all antennas, once $\phi_{i-1}$ has been calculated or determined, $\phi_i$ is calculated. Define:

$$s_{i,j,k} = \sum_{l=1}^{i} h_{l,j,k} e^{j\Phi_l},$$

$$j = 1, 2 \ldots N,$$

$$k = 1, 2 \ldots L,$$

$$p_{i,j,k} = [abs(s_{i,j,k})]^2,$$

$$j = 1, 2 \ldots N,$$

$$k = 1, 2 \ldots L.$$

Then, similarly, the algorithm selects or chooses $\phi_i \in S$ that maximizes $$\sum_{j=1}^{N} \sum_{k=1}^{L} p_{i,j,k}.$$

The total number of possible antenna phase combinations for the recursive algorithm is R ($K_N$−1).

Since the order in which the antennas are optimized may affect the outcome, some criterion may be used for numbering of the antennas. For example, in some embodiments the antennas may be sorted or ordered in ascending/descending order based on the total power $P_{Ant_i}$ of each antenna:

$$P_{Ant_i} = \sum_{j=1}^{N} \sum_{k=1}^{L} [abs(h_{i,j,k})]^2,$$

$$i = 1, 2 \ldots K_N.$$

By repeating the aforementioned process for all beamformers in the hybrid MIMO RDN system an optimized overall gain for the entire hybrid MIMO RDN architecture is achieved.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In various embodiments, computational modules may be implemented by e.g., processors (e.g., a general purpose computer processor or central processing unit executing code or software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A multiple inputs multiple outputs (MIMO) receiving system receiving N channel layers transmitted from N transmit antennas, comprising:

a radio distributed network (RDN) having N beamformers, N being a positive integer greater than 1, each of the N beamformers having $K_N$ antennas comprising one primary receive antenna and $K_N-1$ additional receive antennas, $K_N$ is a positive integer greater than 1;

$K_N-1$ phase shifters within each of the N beamformers configured to phase shift the received signals from each of the $K_N-1$ additional receive antennas within each of the N beamformers;

N combiners respectively associated with the N beamformers, each of the N combiners is configured to combine the $K_N-1$ phase shifted signals and the received signal from the primary antenna for each of the N beamformers;

radio and baseband circuitry configured to receive the combined signals from each of the N combiners; and the MIMO receiving system is configured to select $K_N-1$ phases for the $K_N-1$ phase sifters in each of the N beamformers that: (a) optimizes performance of the N channel layers via channel estimation of each of the N layers as seen by the radio and baseband circuitry, and (b) maximizes a total received power from all transmitted signals received at the MIMO receiving system by all of the receive antennas.

2. The system according to claim 1, further comprising:
for each of the N beamformers:
(i) calculating channel functions $h_{i,j,k}$ from each one of the N transmit antennas j, j=1, 2 ... N, to each one of the $K_N$ receive antennas i, i=1, 2 ... $K_N$ at frequency k, k=1, 2 ... L, at a baseband module using channel estimation, and (ii) selecting phases, wherein $A=\{\phi_1, \phi_2 \ldots \phi_R\}$ so as to maximize a total power $P_{Total}$ defined as:

$$P_{Total} = \sum_{j=1}^{N} \sum_{k=1}^{L} P_{j,k},$$

wherein $P_{j,k}$ denotes power associated with each one of received signals $s_{j,k}$ wherein $$s_{j,k} = \sum_{i=1}^{K_N} h_{i,j,k} e^{j\Phi_i},$$

j=1, 2 ... N, k=1, 2 ... L so that $P_{j,k}=[abs(S_{j,k})]^2$, j=1, 2 ... N, k=1, 2 ... L; and repeating the calculating and the selecting stages for each of the N beamformers.

3. The system according to claim 1, further comprising:

for each of the N beamformers:

adjusting each of the $K_N$ antennas one by one, recursively, wherein $\phi_1$ is set to zero, and only contributions from $h_{1,j,k}$ and $h_{2,j,k}$ are used to calculate $\phi_2$, defining a combined channel $S_{2,j,k}$ and a channel power $p_{2,j,k}$ for two antennas adjusted first as: $p_{2,j,k}=[abs(s_{2,j,k})^2]$, j=1, 2 ... N, k=1, 2 ... L, and choosing $\phi_2 \in A$ that maximizes $$\sum_{j=1}^{N} \sum_{k=1}^{L} p_{2,j,k}.$$

4. The system according to claim 3, wherein the optimization of the phase of the beamformer is calculated, wherein, once $\phi_{i-1}$ has been determined, $\phi_i$ is calculated.

5. The system according to claim 4, wherein:

$$s_{i,j,k} = \sum_{l=1}^{i} h_{l,j,k} e^{j\Phi_l},$$

$j = 1, 2 \ldots N,$ $k = 1, 2 \ldots L$ $p_{i,j,k} = [abs(s_{i,j,k})]^2,$ $j = 1, 2 \ldots N,$ $k = 1, 2 \ldots L$ and wherein the $\phi_i \in A$ that maximizes $$\sum_{j=1}^{N} \sum_{k=1}^{L} p_{i,j,k}.$$

6. The system according to claim 4, wherein:

$\Phi_i \in A \; A=\{\phi_1, \phi_2 \ldots \phi_R\}$ $$P_{Total} = \sum_{j=1}^{N} \sum_{k=1}^{L} P_{j,k}$$

$$S_{j,k} = \sum_{i=1}^{K_N} h_{i,j,k} e^{j\Phi_i}$$

$j = 1, 2 \ldots N,$ $i = 1, 2 \ldots K_N,$ $k = 1, 2 \ldots L$ $P_{j,k} = [abs(S_{j,k})]^2,$ $j = 1, 2 \ldots N,$ $k = 1, 2 \ldots L.$

* * * * *